(12) United States Patent
Osada

(10) Patent No.: US 11,201,332 B2
(45) Date of Patent: Dec. 14, 2021

(54) SULFIDE ALL-SOLID-STATE BATTERY

(71) Applicant: TOYOTA JIDOSHA KABUSHIKI KAISHA, Toyota (JP)

(72) Inventor: Naoki Osada, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 16/597,432

(22) Filed: Oct. 9, 2019

(65) Prior Publication Data
US 2020/0119358 A1    Apr. 16, 2020

(30) Foreign Application Priority Data
Oct. 16, 2018    (JP) .............................. JP2018-195025

(51) Int. Cl.
| | |
|---|---|
| *H01M 4/62* | (2006.01) |
| *H01M 10/052* | (2010.01) |
| *H01M 4/13* | (2010.01) |
| *H01M 10/0562* | (2010.01) |
| *H01M 10/42* | (2006.01) |

(52) U.S. Cl.
CPC ............. *H01M 4/625* (2013.01); *H01M 4/13* (2013.01); *H01M 4/628* (2013.01); *H01M 10/052* (2013.01); *H01M 10/0562* (2013.01); *H01M 10/4235* (2013.01)

(58) Field of Classification Search
None
See application file for complete search history.

(56) References Cited

U.S. PATENT DOCUMENTS

2016/0036054 A1*    2/2016    Yanagi ................ H01M 4/5815
429/189

FOREIGN PATENT DOCUMENTS

| JP | 2011-165650 A | 8/2011 |
|---|---|---|
| JP | 2015-111531 A | 6/2015 |

* cited by examiner

*Primary Examiner* — Robert S Carrico
(74) *Attorney, Agent, or Firm* — Sughrue Mion, PLLC

(57) ABSTRACT

Provided is a sulfide all-solid-state battery configured to suppress hydrogen sulfide generation and decrease battery resistance, wherein the sulfide all-solid-state battery comprises a cathode comprising a cathode layer, an anode comprising an anode layer, and a solid electrolyte layer disposed between the cathode layer and the anode layer; wherein the sulfide all-solid-state battery comprises a composite electroconductive material containing a porous electroconductive material and a basic material; wherein the basic material is contained in pores of the porous electroconductive material; and wherein the composite electroconductive material is contained in at least one of the cathode layer and the anode layer.

6 Claims, 1 Drawing Sheet

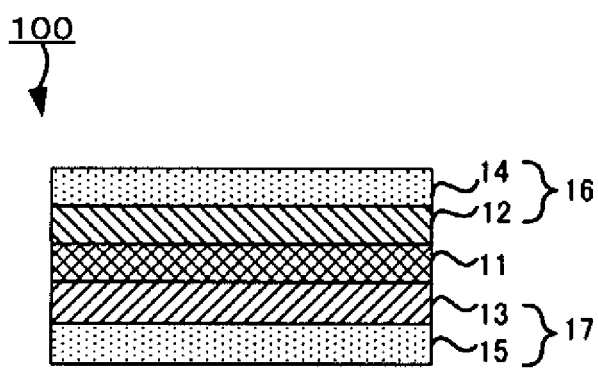

SULFIDE ALL-SOLID-STATE BATTERY

TECHNICAL FIELD

The disclosure relates to a sulfide all-solid-state battery.

BACKGROUND

In recent years, with the rapid spread of IT and communication devices such as personal computers, camcorders and cellular phones, great importance has been attached to the development of batteries that is usable as the power source of such devices. In the automobile industry, etc., high-power and high-capacity batteries for electric vehicles and hybrid vehicles are under development.

Of all-solid-state batteries, an all-solid-state lithium ion battery has attracted attention, due to its high energy density resulting from the use of a battery reaction accompanied by lithium ion transfer, and due to the use of a solid electrolyte as the electrolyte present between the cathode and the anode, in place of a liquid electrolyte containing an organic solvent.

Patent Literature 1 describes that hydrogen sulfide generation from a sulfide-based solid electrolyte battery, is suppressed by incorporating a basic material in the sulfide-based solid electrolyte battery.

Patent Literature 2 discloses an electrolytic film for secondary batteries, comprising a KOH—$ZrO_2$-based or KOH-LDH-based solid electrolyte.

Patent Literature 1: Japanese Patent Application Laid-Open (JP-A) No. 2011-165650

Patent Literature 2: JP-A No. 2015-111531

Hydrogen sulfide generation can be suppressed by incorporating a basic material such as KOH in a sulfide all-solid-state battery. However, due to the basic material, there is a problem of an increase in battery resistance.

SUMMARY

In light of the above circumstance, an object of the disclosed embodiments is to provide a sulfide all-solid-state battery configured to suppress hydrogen sulfide generation and decrease battery resistance.

In a first embodiment, there is provided a sulfide all-solid-state battery,
wherein the sulfide all-solid-state battery comprises a cathode comprising a cathode layer, an anode comprising an anode layer, and a solid electrolyte layer disposed between the cathode layer and the anode layer;
wherein the sulfide all-solid-state battery comprises a composite electroconductive material containing a porous electroconductive material and a basic material;
wherein the basic material is contained in pores of the porous electroconductive material; and
wherein the composite electroconductive material is contained in at least one of the cathode layer and the anode layer.

The basic material may be at least one selected form the group consisting of $Na_2CO_3$, $Li_2CO_3$, $K_2CO_3$, $NaHCO_3$, $LiHCO_3$, $KHCO_3$, NaOH, LiOH, KOH, $Ca(OH)_2$, $Mg(OH)_2$, $Mn(OH)_2$, $Sr(OH)_2$, $Fe(OH)_2$, $Fe(OH)_3$, $Zn(OH)_2$, $Ba(OH)_2$, $Cu(OH)_2$, $La(OH)_3$ and $Al(OH)_3$.

The porous electroconductive material may be at least one of Ketjen Black and carbon nanotube.

The porous electroconductive material may be Ketjen Black, and the basic material may be KOH.

The cathode layer may contain the composite electroconductive material, and a content of the composite electroconductive material in the cathode layer may be 0.5 mass % or more and 4 mass % or less of a total mass of the cathode layer.

A content of the basic material in the composite electroconductive material may be 1 mass % or more and 60 mass % or less of a total mass of the composite electroconductive material.

According to the disclosed embodiments, a sulfide all-solid-state battery configured to suppress hydrogen sulfide generation and decrease battery resistance, can be provided.

BRIEF DESCRIPTION OF THE DRAWINGS

FIG. 1 is a schematic sectional view of an example of the sulfide all-solid-state battery of the disclosed embodiments.

DETAILED DESCRIPTION

The sulfide all-solid-state battery of the disclosed embodiments is a sulfide all-solid-state battery, wherein the sulfide all-solid-state battery comprises a cathode comprising a cathode layer, an anode comprising an anode layer, and a solid electrolyte layer disposed between the cathode layer and the anode layer; wherein the sulfide all-solid-state battery comprises a composite electroconductive material containing a porous electroconductive material and a basic material; wherein the basic material is contained in pores of the porous electroconductive material; and wherein the composite electroconductive material is contained in at least one of the cathode layer and the anode layer.

A sulfide all-solid-state battery comprising a sulfide-based solid electrolyte, generates hydrogen sulfide when the sulfide-based solid electrolyte is in contact with moisture in the air.

Conventional techniques for suppressing hydrogen sulfide generation include, for example, decreasing the proportion of sulfur in the composition of the sulfide-based solid electrolyte, removing impurities that are prone to hydrogen sulfide generation from the sulfide-based solid electrolyte, forming a sulfide-based solid electrolyte with a stable framework, and adding an additive such as a hydrogen sulfide absorber to the sulfide all-solid-state battery for adsorption of hydrogen sulfide.

However, these techniques have a trade-off relationship between the performance of the sulfide-based solid electrolyte (e.g., ion conductivity) and the performance of the battery (e.g., power output).

For example, the additive can absorb hydrogen sulfide. However, the additive decreases battery performance since it blocks ions and electrons in battery electrodes.

It was found that by adding, to the sulfide all-solid-state battery, the composite electroconductive material in which the basic material is contained in the pores of the porous electroconductive material, hydrogen sulfide generation from the sulfide all-solid-state battery can be suppressed, and an increase in the resistance of the sulfide all-solid-state battery can be suppressed compared to the case where the basic material is simply added to the sulfide all-solid-state battery and is not contained in the pores of the porous electroconductive material.

The basic material such as potassium hydroxide is incorporated in the porous electroconductive material such as carbon particles, thereby obtaining the composite electroconductive material. The composite electroconductive material is disposed in or around the electrode layers of the sulfide all-solid-state battery and used as an electroconductive material and as a hydrogen sulfide absorber. When moisture approaches the composite electroconductive material, the basic material in the composite electroconductive material reacts with the moisture and becomes a basic aqueous solution. Since hydrogen sulfide is soluble in the basic aqueous solution, hydrogen sulfide generation from the electrode layers can be prevented or delayed. As a result, the composite electroconductive material can absorb hydrogen sulfide and suppress the amount of hydrogen sulfide generated from the electrode layers or battery, without decreasing the ion conductivity of the sulfide-based solid electrolyte and the battery performance of the sulfide all-solid-state battery.

According to the disclosed embodiments, therefore, the generated hydrogen sulfide amount can be decreased without decreasing the battery performance, while conventional techniques have a trade-off relationship between the battery performance and the suppression of hydrogen sulfide generation by the addition of the additive.

Due to having the pores, the porous electroconductive material has a larger surface area than a non-porous electroconductive material. Accordingly, the electroconductivity (electron conductivity) of the sulfide all-solid-state battery can be increased.

The composite electroconductive material contains the porous electroconductive material and the basic material.

For the content of the basic material in the composite electroconductive material, from the viewpoint of suppressing hydrogen sulfide generation from the sulfide all-solid-state battery and from the viewpoint of easy handling, the lower limit of the content may be 1 mass % or more, 30 mass % or more, or 40 mass % or more of the total mass of the composite electroconductive material. On the other hand, the upper limit of the content may be 60 mass % or less of the total mass of the composite electroconductive material.

As the method for filling the pores of the porous electroconductive material with the basic material, examples include, but are not limited to, a sputtering method, a deposition method and an aqueous solution method.

The pore diameter of the porous electroconductive material is not particularly limited. From the viewpoint of easily filling the pores with the basic material, the lower limit of the pore diameter may be 10 nm or more, or it may be 20 nm or more. On the other hand, the upper limit may be 50 nm or less, may be less than 50 nm, or may be 40 nm or less. The pore diameter of the porous electroconductive material can be observed with a transmission electron microscope (TEM).

The porosity of the porous electroconductive material is not particularly limited. From the viewpoint of filling the pores of the porous electroconductive material with a desired amount of basic material, the porosity may be from 1% to 60%, or it may be from 30% to 60%.

The porous electroconductive material may be at least one carbonaceous material selected from the group consisting of Ketjen Black, carbon nanotube (CNT) and carbon nanofiber (CNF). From the viewpoint of easy handling, the porous electroconductive material may be Ketjen Black. The carbon nanotube and carbon nanofiber may be vapor-grown carbon fiber (VGCF).

The form of the porous electroconductive material is not particularly limited. From the viewpoint of easy handling, the form of the porous electroconductive material may be a particulate form.

When the form of the porous electroconductive material is a particulate form, the average particle diameter of the porous electroconductive material particles is not particularly limited. From the viewpoint of decreasing battery resistance, the lower limit of the average particle diameter may be 0.03 μm or more, may be 0.04 μm or more, or may be 0.05 μm or more. On the other hand, the upper limit may be 0.2 μm or less.

An example of the method for calculating the average particle diameter of the porous electroconductive material particles is as follows. First, for a particle shown in an image taken at an appropriate magnification (e.g., 50,000× to 1,000,000×) with a transmission electron microscope (hereinafter referred to as TEM) or a scanning electron microscope (hereinafter referred to as SEM), the diameter is calculated on the assumption that the particle is spherical. Such a particle diameter calculation by TEM or SEM observation is carried out on 200 to 300 particles of the same type, and the average of the particles is determined as the average particle diameter.

The basic material may be at least one selected form the group consisting of $Na_2CO_3$, $Li_2CO_3$, $K_2CO_3$, $NaHCO_3$, $LiHCO_3$, $KHCO_3$, $NaOH$, $LiOH$, $KOH$, $Ca(OH)_2$, $Mg(OH)_2$, $Mn(OH)_2$, $Sr(OH)_2$, $Fe(OH)_2$, $Fe(OH)_3$, $Zn(OH)_2$, $Ba(OH)_2$, $Cu(OH)_2$, $La(OH)_3$ and $Al(OH)_3$. From the viewpoint of easy handling, the basic material may be KOH. As long as the basic material is contained in the pores of the porous electroconductive material, the basic material may be present on the outer periphery of the porous electroconductive material. When the porous electroconductive material is particles, as long as the basic material is contained in the pores of the porous electroconductive material, the basic material may be present on the surface, etc., of the particles.

The form of the basic material is not particularly limited. From the viewpoint of easy handling, the form of the basic material may be a particulate form.

When the form of the basic material is a particulate form, the particle diameter of the basic material particles is not particularly limited, as long as it is smaller than the pore diameter of the porous electroconductive material, from the viewpoint of easily filling the pores of the porous electroconductive material with the basic material.

The composite electroconductive material may be contained in at least one of the cathode layer and the anode layer, or it may be contained in both the cathode layer and the anode layer. From the viewpoint of better battery performance, the composite electroconductive material may be contained in at least the cathode layer.

FIG. 1 is a schematic sectional view of an example of the sulfide all-solid-state battery of the disclosed embodiments.

As shown in FIG. 1, a sulfide all-solid-state battery 100 comprises a cathode 16 comprising a cathode layer 12 and a cathode current collector 14, an anode 17 comprising an anode layer 13 and an anode current collector 15, and a solid electrolyte layer 11 disposed between the cathode 16 and the anode 17.

[Cathode]

The cathode comprises at least the cathode layer and the cathode current collector.

The cathode layer contains a cathode active material. As optional components, the cathode layer may contain a solid electrolyte, the composite electroconductive material and a binder.

In the disclosed embodiments, the composite electroconductive material may be contained in at least one of the cathode layer and the anode layer. From the viewpoint of better battery performance, the composite electroconductive material may be contained in the cathode layer. Even when the composite electroconductive material is contained in the cathode layer, the cathode layer may contain an electroconductive material other than the composite electroconductive material. As the electroconductive material other than the composite electroconductive material, examples include, but are not limited to, a non-porous carbonaceous material such as acetylene black, and the porous electroconductive material in which, however, the basic material is not contained in the pores.

From the viewpoint of suppressing hydrogen sulfide generation and decreasing battery resistance, the content of the composite electroconductive material in the cathode layer may be 0.5 mass % or more and 4 mass % or less of the total mass of the cathode layer.

The content ratio of the other electroconductive material in the cathode layer is not particularly limited.

The type of the cathode active material is not particularly limited. As the cathode active material, examples include, but are not limited to, $LiCoO_2$, $LiNi_xCo_{1-x}O_2$ (0<x<1), $LiNi_{1/3}Co_{1/3}Mn_{1/3}O_2$, $LiMnO_2$, different element-substituted Li—Mn spinels (such as $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$ and $LiMn_{1.5}Zn_{0.5}O_4$), lithium titanates (such as $Li_4Ti_5O_{12}$), lithium metal phosphates (such as $LiFePO_4$, $LiMnPO_4$, $LiCoPO_4$ and $LiNiPO_4$), transition metal oxides (such as $V_2O_5$ and $MoO_3$), $TiS_2$, LiCoN, Si, $SiO_2$, $Li_2SiO_3$, $Li_4SiO_4$, and lithium storage intermetallic compounds (such as $Mg_2Sn$, $Mg_2Ge$, $Mg_2Sb$ and $Cu_3Sb$).

The form of the cathode active material is not particularly limited. It may be a particulate form.

A coating layer containing a Li ion conducting oxide may be formed on the surface of the cathode active material. This is because a reaction between the cathode active material and the solid electrolyte can be suppressed.

As the Li ion conducting oxide, examples include, but are not limited to, $LiNbO_3$, $Li_4Ti_5O_{12}$ and $Li_3PO_4$. For the thickness of the coating layer, the lower limit may be 0.1 nm or more, or it may be 1 nm or more, for example. On the other hand, the upper limit may be 100 nm or less, or it may be 20 nm or less, for example. The coverage of the coating layer on the cathode active material surface may be 70% or more, or it may be 90% or more, for example.

The content ratio of the cathode active material in the cathode layer is not particularly limited. The lower limit of the content ratio may be 63.0 mass % or more of the total mass of the cathode layer, or it may be 67.2 mass % or more of the total mass of the cathode layer. On the other hand, the upper limit of the content ratio may be 72.0 mass % or less of the total mass of the cathode layer.

As the solid electrolyte used in the cathode layer, examples include, but are not limited to, those mentioned below as the examples of the solid electrolyte used in the solid electrolyte layer.

The content ratio of the solid electrolyte in the cathode layer is not particularly limited. The lower limit of the content ratio may be 24.0 mass % or more of the total mass of the cathode layer. On the other hand, the upper limit may be 29.8 mass % or less of the total mass of the cathode layer.

As the binder, examples include, but are not limited to, acrylonitrile-butadiene rubber (ABR), butadiene rubber (BR), polyvinylidene fluoride (PVdF) and styrene-butadiene rubber (SBR). The content of the binder in the cathode layer is not particularly limited.

The thickness of the cathode layer is not particularly limited.

The cathode layer can be formed by a conventionally-known method.

For example, the cathode active material, the composite electroconductive material and the binder are added to a solvent and mixed to produce a cathode slurry. The cathode slurry is applied on one surface of a substrate such as the cathode current collector, and the applied cathode slurry is dried, thereby forming the cathode layer.

As the solvent, examples include, but are not limited to, butyl acetate, heptane and N-methyl-2-pyrrolidone.

The method for applying the cathode slurry on one surface of the substrate such as the cathode current collector, is not particularly limited. As the method, examples include, but are not limited to, a doctor blade method, a metal mask printing method, an electrostatic coating method, a dip coating method, a spray coating method, a roller coating method, a gravure coating method and a screen printing method.

The cathode layer can be formed by another method. For example, the cathode layer can be formed by pressure-forming a powdered cathode mix that contains the cathode active material and, as needed, other components.

As the cathode current collector, a conventionally-known metal that is usable as a current collector in all-solid-state batteries, can be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the cathode current collector is not particularly limited. As the form, examples include, but are not limited to, various kinds of forms such as a foil form and a mesh form.

The form of the whole cathode is not particularly limited. It may be a sheet form. In this case, the thickness of the whole cathode is not particularly limited. It can be determined depending on desired performance.

[Solid Electrolyte Layer]

The solid electrolyte layer contains at least a sulfide-based solid electrolyte as the solid electrolyte.

As the sulfide-based solid electrolyte, examples include, but are not limited to, $Li_2S$—$P_2S_5$, $Li_2S$—$SiS_2$, LiX—$Li_2S$—$SiS_2$, LiX—$Li_2S$—$P_2S_5$, LiX–$Li_2O$—$Li_2S$—$P_2S_5$, LiX—$Li_2S$—$P_2O_5$, LiX—$Li_3PO_4$—$P_2S_5$ and $Li_3PS_4$. The "$Li_2S$—$P_2S_5$" means a material composed of a raw material composition containing $Li_2S$ and $P_2S_5$, and the same applies to other solid electrolytes. Also, "X" in the "LiX" means a halogen element. The raw material composition may contain one or more kinds of halogen elements.

The sulfide-based solid electrolytes may be a glass, a crystal material or a glass ceramic. The glass can be obtained by amorphizing a raw material composition (such as a mixture of $Li_2S$ and $P_2S_5$). The raw material composition can be amorphized by mechanical milling, for example. The mechanical milling may be dry mechanical milling or wet mechanical milling. The mechanical milling may be the latter because attachment of the raw material composition to the inner surface of a container, etc., can be prevented. The glass ceramic can be obtained by heating a glass. The crystal material can be obtained by developing a solid state reaction of the raw material composition, for example.

The form of the solid electrolyte may be a particulate form.

The average particle diameter (median diameter or $D_{50}$) of the solid electrolyte particles is not particularly limited. The lower limit may be 0.5 µm or more, and the upper limit may be 2 µm or less.

As the solid electrolyte, one or more kinds of solid electrolytes may be used. In the case of using two or more kinds of solid electrolytes, they may be mixed together, or they may be formed into layers to obtain a multi-layered structure.

In the disclosed embodiments, the median diameter ($D_{50}$) of particles is a diameter at which, when the particle diameters of particles are measured by laser diffraction/scattering particle size distribution measurement and are arranged in ascending order, the accumulated volume of the particles is half (50%) the total volume of the particles (volume average diameter).

The content ratio of the solid electrolyte in the solid electrolyte layer is not particularly limited. For example, the lower limit of the content ratio may be 50 mass % or more, may be 60 mass % or more, or may be 70 mass % or more. On the other hand, the upper limit may be 100 mass % or less, for example.

From the viewpoint of exerting plasticity, etc., a binder for binding the solid electrolyte particles can be incorporated in the solid electrolyte layer. As the binder, examples include, but are not limited to, a binder that can be incorporated in the above-described cathode. However, the content of the binder in the solid electrolyte layer may be 5 mass % or less, from the viewpoint of preventing excessive aggregation of the solid electrolyte, enabling the formation of the solid electrolyte layer in which the solid electrolyte is uniformly dispersed, etc., for the purpose of easily achieving high power output.

The thickness of the solid electrolyte layer is not particularly limited. It is generally 0.1 μm or more and 1 mm or less.

[Anode]

The anode comprises an anode layer and an anode current collector.

The anode layer contains an anode active material. As optional components, the anode layer may contain a solid electrolyte, the composite electroconductive material and a binder.

As the anode active material, a conventionally-known material can be used. As the anode active material, examples include, but are not limited to, an elemental Li, a lithium alloy, carbon, an elemental Si, a Si alloy and $Li_4Ti_5O_{12}$ (LTO).

As the lithium alloy, examples include, but are not limited to, LiSn, LiSi, LiAl, LiGe, LiSb, LiP and LiIn.

As the Si alloy, examples include, but are not limited to, an alloy with a metal such as Li, and an alloy with at least one metal selected from the group consisting of Sn, Ge and Al.

By assembling the sulfide all-solid-state battery and initially charging the battery, the elemental Si may be reacted with a metal such as Li to form an amorphous alloy. An alloyed part of the elemental Si is kept amorphized even after metal ions such as lithium ions are released by discharging the battery. In the disclosed embodiments, therefore, the anode layer comprising the elemental Si includes such a state that the elemental Si is formed into amorphous alloy.

The form of the anode active material is not particularly limited. For example, it may be a particulate form or a thin film form.

When the anode active material is in a particulate form, the average particle diameter ($D_{50}$) of the anode active material particles may be 1 nm or more and 100 μm or less, or it may be 10 nm or more and 30 μm or less, for example.

As the composite electroconductive material, binder and solid electrolyte contained in the anode layer, examples include, but are not limited to, those mentioned above as the examples of the composite electroconductive material, binder and solid electrolyte contained in the cathode layer.

The anode layer may contain an electroconductive material other than the composite electroconductive material. As the electroconductive material other than the composite electroconductive material, examples include, but are not limited to, those mentioned above as the examples of the other electroconductive material contained in the cathode layer.

The method for forming the anode layer is not particularly limited. As the method, examples include, but are not limited to, pressure-forming a powdered anode mix that contains the anode active material and, as needed, other components such as the composite electroconductive material and a binder. Another example of the method for producing the anode layer is as follows: an anode slurry containing the anode active material, a solvent and, as needed, other components such as the composite electroconductive material and a binder, is prepared; the anode slurry is applied on one surface of the anode current collector or solid electrolyte layer; and the applied anode slurry is dried, thereby forming the anode layer. The solvent used in the anode slurry may be the same solvent as the one used in the cathode slurry. As the method for applying the anode slurry to one surface of the anode current collector or solid electrolyte layer, examples include, but are not limited to, those mentioned above as the examples of the method for applying the cathode slurry.

As the anode current collector, a conventionally-known metal that is usable as a current collector in all-solid-state batteries, can be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the anode current collector is not particularly limited. As the form, examples include, but are not limited to, various kinds of forms such as a foil form and a mesh form.

The form of the whole anode is not particularly limited. It may be a sheet form. In this case, the thickness of the whole anode is not particularly limited. It can be determined depending on desired performance.

As needed, the sulfide all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is a material that is stable in electrolytes. As the material, examples include, but are not limited to, resins such as polypropylene, polyethylene and acrylic resin.

As the sulfide all-solid-state battery, examples include, but are not limited to, a lithium battery in which a lithium metal deposition-dissolution reaction is used as an anode reaction, a lithium ion battery which is charged and discharged by lithium ion transfer between the cathode and the anode, a sodium battery, a magnesium battery and a calcium battery. The sulfide all-solid-state battery may be a lithium ion battery. Also, the sulfide all-solid-state battery may be a primary or secondary battery.

As the form of the sulfide all-solid-state battery, examples include, but are not limited to, a coin form, a laminate form, a cylindrical form and a square form.

The method for producing the sulfide all-solid-state battery of the disclosed embodiments, is as follows, for example. First, the solid electrolyte layer is formed by pressure-forming a powdered solid electrolyte material. Next, the cathode layer is obtained by pressure-forming the powdered cathode mix on one surface of the solid electrolyte layer. Then, the anode layer is obtained by pressure-forming the powdered anode mix on the other surface of the solid electrolyte layer. Then, a cathode layer-solid electrolyte layer-anode layer assembly thus obtained, can be used as the sulfide all-solid-state battery.

In this case, the press pressure applied for pressure-forming the powdered solid electrolyte material, the powdered cathode mix and the powdered anode mix, is generally about 1 MPa or more and about 600 MPa or less.

The pressure applying method is not particularly limited. As the method, examples include, but are not limited to, applying pressure by use of a plate press machine, a roll press machine, etc.

Another example of the method for forming the sulfide all-solid-state battery of the disclosed embodiments, is as follows. First, the solid electrolyte layer is formed by pressure-forming the powdered solid electrolyte material. The cathode slurry is applied on one surface of the cathode current collector. The applied cathode slurry is dried, thereby obtaining the cathode comprising the cathode layer. Then, the anode slurry is applied on one surface of the anode current collector. The applied anode slurry is dried, thereby obtaining the anode comprising the anode layer. The solid electrolyte layer is disposed between the cathode layer and the anode layer to ensure that the cathode current collector, the cathode layer, the solid electrolyte layer, the anode layer and the anode current collector are arranged in this order, thereby obtaining the sulfide all-solid-state battery.

The production of the sulfide all-solid-state battery may be carried out in the state that moisture is removed from the system as much as possible. For example, it is thought to be effective to depressurize the inside of the system in the production steps and to replace the inside of the system by a substantially moisture-free gas (such as inert gas) in the production steps.

EXAMPLES

Example 1

[Production of Composite Electroconductive Material]

Ketjen Black particles (manufactured by Lion Specialty Chemicals Co., Ltd.) were used as the porous electroconductive material. KOH was used as the basic material. The pore diameter of the pores of the porous electroconductive material was from 20 nm to 40 nm.

The pores of the porous electroconductive material were filled with the basic material by a sputtering method, thereby obtaining the composite electroconductive material. The mass of the basic material contained in the composite electroconductive material was 40 mass % of the total mass of the composite electroconductive material.

[Production of Cathode Layer]

All experimental works relating to the production of the cathode layer, were carried out in a glove box in which the atmosphere was controlled with Ar gas having a dew point of −70° C. or less.

$LiNi_{1/3}Co_{1/3}Mn_{1/3}O_2$, which was used as the cathode active material, $75Li_2S$-$25P_2S_5$, which was used as the sulfide-based solid electrolyte, and the composite electroconductive material were put in a mortar at a ratio of 67.2:28.8:4 (mass %). They were mixed in the mortar to obtain a mixture.

Heptane, which is a non-polar organic solvent and was used as the solvent, was added to the mixture in the mortar. In addition, as the binder, a butadiene rubber-based (BR-based) binder in an amount of 3 mass % with respect to 100 mass % of the mixture, was added to the mixture in the mortar. They were mixed by use of an ultrasonic homogenizer, thereby obtaining a slurry.

The slurry was applied on an aluminum foil by use of a doctor blade. The applied slurry was dried at 100° C. to form the cathode layer on the aluminum foil, thereby obtaining the cathode layer for use in sulfide all-solid-state battery production. The cathode layer was removed from the aluminum foil and cut into a 1 cm² disk. The cathode layer disk was used in battery performance evaluation described below.

Example 2

A cathode layer for use in sulfide all-solid-state battery production, was produced in the same manner as Example 1, except that in the "Production of cathode layer", the cathode active material ($LiNi_{1/3}Co_{1/3}Mn_{1/3}O_2$), the sulfide-based solid electrolyte ($75Li_2S$-$25P_2S_5$) and the composite electroconductive material were put in the mortar at a ratio of 68.6:29.4:2 (mass %).

Example 3

A cathode layer for use in sulfide all-solid-state battery production, was produced in the same manner as Example 1, except that in the "Production of cathode layer", the cathode active material ($LiNi_{1/3}Co_{1/3}Mn_{1/3}O_2$), the sulfide-based solid electrolyte ($75Li_2S$-$25P_2S_5$) and the composite electroconductive material were put in the mortar at a ratio of 69.7:29.8:0.5 (mass %).

Example 4

A cathode layer for use in sulfide all-solid-state battery production, was produced in the same manner as Example 1, except that in the "Production of cathode layer", the cathode active material ($LiNi_{1/3}Co_{1/3}Mn_{1/3}O_2$), the sulfide-based solid electrolyte ($75Li_2S$-$25P_2S_5$) and the composite electroconductive material were put in the mortar at a ratio of 72:24:4 (mass %).

Comparative Example 1

$LiNi_{1/3}Co_{1/3}Mn_{1/3}O_2$, which was used as the cathode active material, $75Li_2S$-$25P_2S_5$, which was used as the sulfide-based solid electrolyte, and Ketjen Black particles, which were used as the porous electroconductive material and in which the basic material was not contained in the pores, were put in a mortar at a ratio of 67.2:28.8:4 (mass %). They were mixed in the mortar to obtain a mixture.

Heptane, which is a non-polar organic solvent and was used as the solvent, was added to the mixture in the mortar. In addition, as the binder, a BR-based binder in an amount of 3 mass % with respect to 100 mass % of the mixture, was added to the mixture in the mortar. They were mixed by use of the ultrasonic homogenizer, thereby obtaining a slurry.

The slurry was applied on an aluminum foil by use of the doctor blade. The applied slurry was dried at 100° C. to form the cathode layer on the aluminum foil, thereby obtaining the cathode layer for use in sulfide all-solid-state battery production. The cathode layer was removed from the aluminum foil and cut into a 1 cm² disk. The cathode layer disk was used in the below-described evaluation.

Comparative Example 2

A cathode layer for use in sulfide all-solid-state battery production, was produced in the same manner as Comparative Example 1, except that KOH was used as the basic material, and the cathode active material (LiNi$_{1/3}$Co$_{1/3}$Mn$_{1/3}$O$_2$), the sulfide-based solid electrolyte (75Li$_2$S-25P$_2$S$_5$), the porous electroconductive material (Ketjen Black particles in which the basic material was not contained in the pores) and the basic material (KOH) were put in the mortar at a ratio of 67.2:28.8:2:2 (mass %).

Comparative Example 3

A cathode layer for use in sulfide all-solid-state battery production, was produced in the same manner as Comparative Example 1, except that KOH was used as the basic material, and the cathode active material (LiNi$_{1/3}$Co$_{1/3}$Mn$_{1/3}$O$_2$), the sulfide-based solid electrolyte (75Li$_2$S-25P$_2$S$_5$), the porous electroconductive material (Ketjen Black particles in which the basic material was not contained in the pores) and the basic material (KOH) were put in the mortar at a ratio of 63:27:2:10 (mass %).
[Battery Performance Evaluation]
[Evaluation of Electron Conductivity of Cathode Layer]

The electron conductivity of the cathode layer of Example 1 was measured by use of an ion blocking cell produced as follows.

A Pt foil was used as both counter and reference electrodes. Pt-coated SUS pins were used as a working electrode. The cathode layer of Example 1 was used as an electrode disk. The cathode layer was placed on the Pt foil to form a laminate. The laminate was sandwiched between the SUS pins, thereby obtaining the ion blocking cell of Example 1.

Current was applied to the working electrode, with changing the current value, and changes in the voltage of the ion blocking cell were measured.

The electron conductivity (S/cm) of the cathode layer of Example 1 was calculated from the volume of the cathode layer and the relationship between the voltage value of the ion blocking cell and the current value applied to the working electrode. The result is shown in Table 1.

The electron conductivities of the cathode layers of Examples 2 to 4 and Comparative Examples 1 to 3, were measured in the same manner as Example 1. The results are shown in Table 1.
[Evaluation of Lithium Ion Conductivity of Cathode Layer]

The lithium ion conductivity of the cathode layer of Example 1 was measured by use of a non-ion blocking cell produced as follows.

The cathode layer was sandwiched between two solid electrolyte pellet layers. The resulting product was further sandwiched between two Li metal plates, thereby obtaining the non-ion blocking cell of Example 1, in which the first Li metal plate, the first solid electrolyte pellet layer, the cathode layer, the second solid electrolyte pellet layer and the second Li metal plate, were stacked in this order.

Constant current was applied to the non-ion blocking cell, with changing the applied constant current value every certain amount of time, and changes in the voltage of the non-ion blocking cell were measured.

Two solid electrolyte pellet layers (first and second solid electrolyte pellet layers) were stacked to form a laminate of the first and second solid electrolyte pellet layers. Changes in the voltage of the laminate was measured in the same manner as the non-ion blocking cell.

The lithium ion conductivity of the laminate of the first solid electrolyte pellet layer, the cathode layer and the second solid electrolyte pellet layer, the laminate being contained in the non-ion blocking cell, was calculated from the volume of the first solid electrolyte pellet layer, the volume of the second solid electrolyte pellet layer, the volume of the cathode layer, and the relationship between the voltage value of the non-ion blocking cell and the current value applied to the non-ion blocking cell.

The lithium ion conductivity of the laminate of the first and second solid electrolyte pellet layers, was calculated from the volume of the first solid electrolyte pellet layer, the volume of the second solid electrolyte pellet layer, and the relationship between the voltage value of the laminate of the first and second solid electrolyte pellet layers and the current value applied to the laminate of the first and second solid electrolyte pellet layers.

Then, the difference between the lithium ion conductivity of the laminate of the first solid electrolyte pellet layer, the cathode layer and the second solid electrolyte pellet layer and the lithium ion conductivity of the laminate of the first and second solid electrolyte pellet layers, was obtained. The difference was determined as the lithium ion conductivity of the cathode layer of Example 1. The result is shown in Table 1.

The lithium ion conductivities of the cathode layers of Examples 2 to 4 and Comparative Examples 1 to 3 were measured in the same manner as Example 1. The results are shown in Table 1.
[Evaluation of Amount of Hydrogen Sulfide Generated from Cathode Layer]

The cathode layer of Example 1 and a hydrogen sulfide sensor were put in a 1.5 L separable beaker. While the air in the beaker was agitated by a fan, the concentration of hydrogen sulfide generated from the cathode layer was recorded.

From the thus-obtained hydrogen sulfide concentration and the amount of the sulfide-based solid electrolyte contained in the cathode layer, the generated hydrogen sulfide amount per unit mass was calculated. The result is shown in Table 1.

The generated hydrogen sulfide amounts of Examples 2 to 4 and Comparative Examples 1 to 3 were calculated in the same manner as Example 1. The results are shown in Table 1.

TABLE 1

|  | Electron conductivity (S/cm) of cathode layer | Lithium ion conductivity (S/cm) of cathode layer | Generated hydrogen sulfide amount (ml/g) |
|---|---|---|---|
| Comparative Example 1 | $1.1 \times 10^{-2}$ | $5.2 \times 10^{-5}$ | 5.6 |
| Comparative Example 2 | $0.1 \times 10^{-2}$ | $0.8 \times 10^{-5}$ | 2.3 |
| Comparative Example 3 | $0.1 \times 10^{-2}$ | $0.2 \times 10^{-5}$ | 0.7 |
| Example 1 | $1.2 \times 10^{-2}$ | $5.4 \times 10^{-5}$ | 1.2 |
| Example 2 | $1.1 \times 10^{-2}$ | $5.6 \times 10^{-5}$ | 1.1 |
| Example 3 | $0.8 \times 10^{-2}$ | $5.7 \times 10^{-5}$ | 1.5 |
| Example 4 | $0.7 \times 10^{-2}$ | $5.5 \times 10^{-5}$ | 1.8 |

It was revealed that the amount of hydrogen sulfide generated from the cathode layer of Comparative Example 1, in which the basic material was not used, is larger than the cathode layers of other examples and comparative examples.

In Comparative Examples 2 and 3, as described above, the basic material and the porous electroconductive material in which the pores were not filled with the basic material, were simply added. For such Comparative Examples 2 and 3, it was revealed that while the effect of decreasing the generated hydrogen sulfide amount was confirmed, the electron conductivity and lithium ion conductivity of the cathode layer were decreased as a trade-off.

It was proved that the cathode layers of Examples 1 to 4, in which the composite electroconductive material was used, can decrease the generated hydrogen sulfide amount, while keeping the electron conductivity and lithium ion conductivity at the same level as the cathode layer of Comparative Example 1.

Accordingly, it was revealed that by using, in a sulfide all-solid-state battery, the cathode layers of Examples 1 to 4 in which the composite electroconductive material was used, hydrogen sulfide generation from the sulfide all-solid-state battery can be suppressed, and the resistance of the sulfide all-solid-state battery can be decreased.

REFERENCE SIGNS LIST

11. Solid electrolyte layer
12. Cathode layer
13. Anode layer
14. Cathode current collector
15. Anode current collector
16. Cathode
17. Anode
100. Sulfide all-solid-state battery

The invention claimed is:

1. A sulfide all-solid-state battery,
    wherein the sulfide all-solid-state battery comprises a cathode comprising a cathode layer, an anode comprising an anode layer, and a solid electrolyte layer disposed between the cathode layer and the anode layer;
    wherein the sulfide all-solid-state battery comprises a composite electroconductive material containing a porous electroconductive material and a basic material;
    wherein the basic material is contained in pores of the porous electroconductive material; and
    wherein the composite electroconductive material is contained in at least one of the cathode layer and the anode layer.

2. The sulfide all-solid-state battery according to claim 1, wherein the basic material is at least one selected form the group consisting of $Na_2CO_3$, $Li_2CO_3$, $K_2CO_3$, $NaHCO_3$, $LiHCO_3$, $KHCO_3$, NaOH, LiOH, KOH, $Ca(OH)_2$, $Mg(OH)_2$, $Mn(OH)_2$, $Sr(OH)_2$, $Fe(OH)_2$, $Fe(OH)_3$, $Zn(OH)_2$, $Ba(OH)_2$, $Cu(OH)_2$, $La(OH)_3$ and $Al(OH)_3$.

3. The sulfide all-solid-state battery according to claim 1, wherein the porous electroconductive material is at least one of Ketjen Black and carbon nanotube.

4. The sulfide all-solid-state battery according to claim 1, wherein the porous electroconductive material is Ketjen Black, and
    wherein the basic material is KOH.

5. The sulfide all-solid-state battery according to claim 1, wherein the cathode layer contains the composite electroconductive material, and
    wherein a content of the composite electroconductive material in the cathode layer is 0.5 mass % or more and 4 mass % or less of a total mass of the cathode layer.

6. The sulfide all-solid-state battery according to claim 1, wherein a content of the basic material in the composite electroconductive material is 1 mass % or more and 60 mass % or less of a total mass of the composite electroconductive material.

* * * * *